United States Patent [19]

Dolejs

[11] Patent Number: 4,554,807

[45] Date of Patent: Nov. 26, 1985

[54] DOOR LATCH MECHANISM

[75] Inventor: Anthony H. Dolejs, Bedford Heights, Ohio

[73] Assignee: ARDAC, Inc., Eastlake, Ohio

[21] Appl. No.: 541,113

[22] Filed: Oct. 12, 1983

[51] Int. Cl.[4] .................................. B60R 25/02

[52] U.S. Cl. .................................. 70/208; 70/209

[58] Field of Search .................. 70/208, 209, 210, 211, 70/224, 417; 292/DIG. 31

[56] References Cited

U.S. PATENT DOCUMENTS

| | | | |
|---|---|---|---|
| 2,164,150 | 6/1939 | Brewster | 70/208 |
| 2,317,700 | 4/1943 | Thompson | 292/DIG. 31 |
| 3,958,821 | 5/1976 | Scalera | 70/208 |

*Primary Examiner*—Robert L. Wolfe

*Attorney, Agent, or Firm*—Oldham, Oldham & Weber Co.

[57] ABSTRACT

A lock mechanism for securing the cabinet of a security validator. A latch handle is maintained within a recess within a latch housing. The handle is pivotal about an axis and moves within an opening in the latch housing, transversing a slot within the housing. A lock cylinder has a plate connected thereto and adapted for positioning within the slot to engage and maintain the handle within the recess and slightly depressed therein. The handle is spring-biased to normally urge it from the recess. A freely rotatable disc is positioned before the lock cylinder to prevent unauthorized access thereto.

11 Claims, 3 Drawing Figures

DOOR LATCH MECHANISM

TECHNICAL FIELD

The invention herein resides in the art of locking devices. More particularly, the invention is adapted for securing cabinetry such as the cabinets used for maintaining security validators and changers. Such cabinets, maintaining large volumes of cash therein, pose an invitation to wrongful entry. The instant invention is adapted for securing such cabinets and defeating unauthorized access by means of the unique combination of elements hereinafter described.

BACKGROUND OF THE INVENTION

For centuries, man has perceived and developed various types of locking devices to secure for himself, to the exclusion of others, his prized possessions. The nature and complexity of the lock has generally been dependent upon the nature of the object to be secured, its structure, value, size, and the like. While there are some universal characteristics attributed to locks in general, peculiarities and sophistication of the locks are determined, primarily, by the perceived determination of others to gain unlawful access. Currency validators, such as coin changers, maintain therein significant volumes of cash. Further, such currency validators are, of necessity, placed where the public may freely travel, requiring that the validators themselves include foolproof locking mechanisms to prevent any of the large number of people who frequent such machines from making unlawful or illegal withdrawals.

While it is desired that a locking mechanism for a currency validator be of sufficient integrity to prevent unauthorized entry, the locking mechanism must be of sufficient simplicity to allow authorized personnel to gain ready access to the validator for servicing.

Previously known locks or locking mechanisms for security validators have been formed of a zinc die casting, the same being suprisingly easy to defeat by breakage, drilling, or the like. Further, in certain instances, the locks have been connected to the cabinet by exposed fasteners, such as screws or bolts, which fasteners might readily be removed by a thief. Where key locks are used, the lock cylinder has typically been unprotected, susceptible to defeat by a drill bit or cylinder puller. Yet further, previously known locking mechanisms have left the lock cylinder unrestrained such that it is susceptible to a punch, driving the cylinder from its locking position. Further inherent with previously known locking mechanisms is that such mechansims are of a specific design, adapted for receiving but a single lock cylinder, and incapable of being adapted for acceptance of various types of lock cylinders. Accordingly, a customer desiring a specific lock cylinder for implementation in its security validator would mandate a substantial redesign of the entire mechanism to obtain the desired result.

Finally, known locking mechanisms for security validators have often left the latch handle sufficiently exposed as to invite prying with a screwdriver or other sharp implement for ultimate defeat.

DISCLOSURE OF THE INVENTION

In light of the foregoing, it is a first aspect of the invention to provide a door latch mechanism of stainless steel construction, uneffected by attempts at drilling and breaking.

Another aspect of the invention is the provision of a door latch mechanism wherein there are no exposed fasteners interconnecting the mechanism to the cabinet which it seeks to secure.

A further aspect of the invention is the provision of a door latch mechanism wherein the lock cylinder is protected and maintained in such a manner as to prevent drilling, prying, pulling, or punching the cylinder from its housing.

Yet an additional aspect of the invention is the provision of a door latch mechanism wherein the cylinder housing is adapted for receipt of any of numerous lock cylinders.

A further aspect of the invention is the provision of a door latch mechanism wherein the latch handle is received within a recess of close tolerance, impeding any effort of prying or the like, and wherein the face of the latch handle is slightly recessed below the face of the front plate to impede prying and to compensate for alignment irregularities resulting from dimensional and angular deviations.

Yet an additional aspect of the invention is the provision of a door latch mechanism of high integrity, but which is readily constructed of state-of-the-art elements and adapted for implementation with existing cabinetry.

The foregoing and other aspects of the invention which will become apparent as the detailed description proceeds are achieved by a latch assembly, comprising: a latch housing; a handle received within a recess within said latch housing, said handle being pivotal about an axis; and a spring in engagement with said handle and urging said handle from said recess.

Other aspects of the invention are attained by a device for securing a cabinet door, comprising: a latch housing having a recess therein, said latch housing being received by said cabinet and being substantially flush with a surface thereof, said latch housing having an opening therein and a slot transversing said opening; a handle received within said recess and pivotal within said opening about an axis, pivotal movement of said handle transversing said slot; a lock cylinder housing connected to said latch housing and having a lock cylinder maintained therewithin; and a locking plate connected to said lock cylinder and selectively positional within said slot, engaging said handle, and maintaining said handle within said recess.

DESCRIPTION OF DRAWINGS

For a complete understanding of the objects, techniques and structure of the invention reference should be had to the following detailed description and accompanying drawings wherein.

BEST MODE FOR CARRYING OUT THE INVENTION

Figure 3:
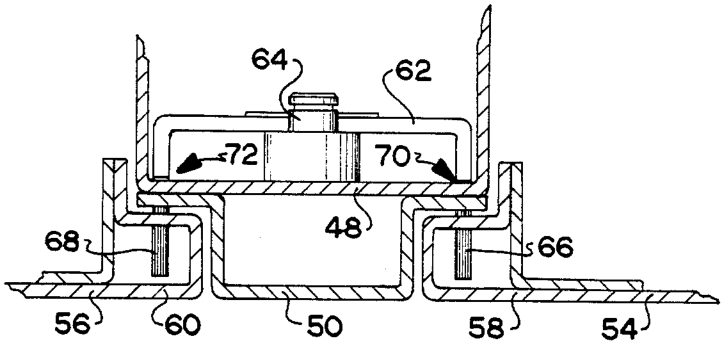
FIG. 3 is a sectional view of the latch rail of the invention, showing the relationship thereof with the doors of a two-door cabinet.
Figure 1:
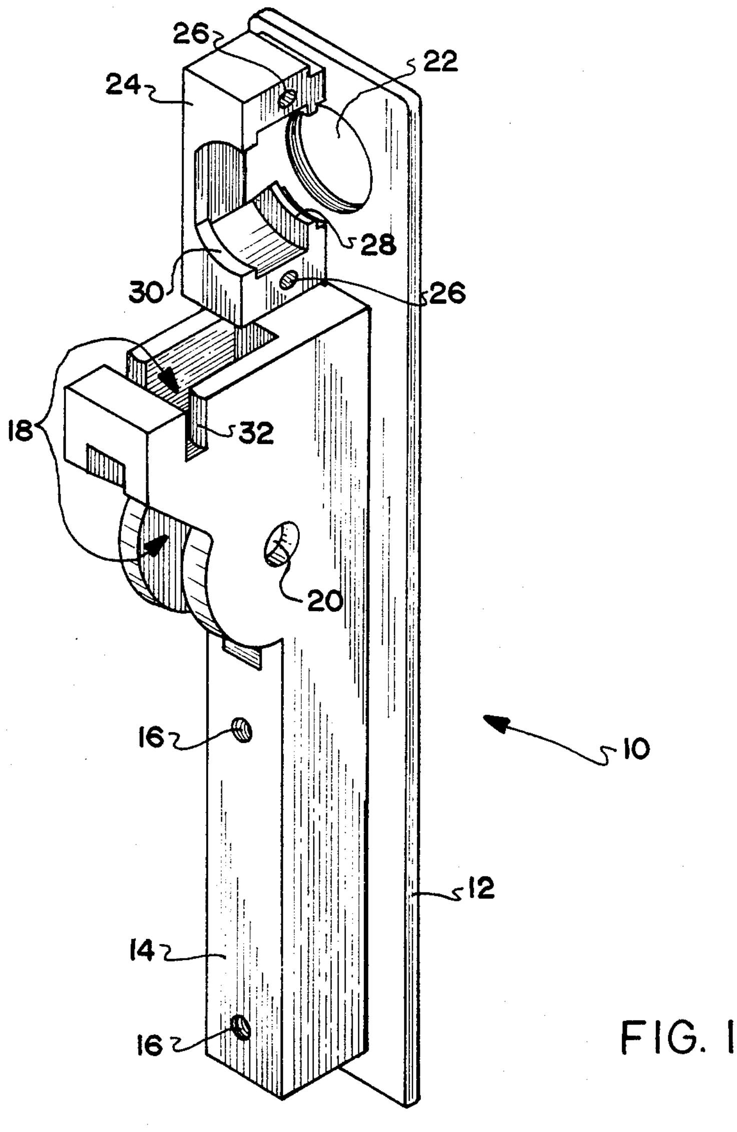
FIG. 1 is a rear perspective view of the latch assembly of the invention, showing the same removed from the latch rail.

Referring now to the drawings and more particularly FIG. 1, it can be seen that a latch assembly according to the invention is designated generally by the numeral 10. A thin front plate 12 defines the major periphery of the latch assembly 10, and has extending from the back portion thereof a latch housing 14. The thickness of the front plate 12 varies with the degree of security desired. Preferably, the plate 12 mounts substantially flush with the cabinetry as shown in FIG. 3. Screw holes 16 are provided in the latch housing 14 for mounting and securing the assembly 10 to the back 48 of the latch rail as shown in FIG. 3. The structure of the latch rail will be described hereinafter. Suffice it to say at this time that the latch housing 14 receives a handle therewithin which, when closed, is flush with the surface of the front plate 12. It is also contemplated that the handle may be slightly recessed with respect to the front plate 12 to further impede prying. At this time, the handle covers the screws passing through the screw hole 16, such that the fasteners are not accessible.

The latch housing 14 is characterized by latch head passage 18 through which the head of the latch may pass as it is pivoted about a pin passing through the hole 20. This structure will become further apparent in reference to FIG. 2.

A circular opening 22 is provided in the front plate 12 through which a key may be inserted for making access to a key cylinder. The key cylinder is maintained within a cylinder retainer housing 24, only half of which is shown in the illustration of FIG. 1. It will be appreciated that an identical half (not shown) may be interconnected with the illustrated half of the cylinder retainer housing by means of screws or pins received in the hole 26. An inner retaining flange 28 characterizes the front portion of the housing 24 nearest the opening 22, while an outer flange 30 characterizes the rearward portion of the cylinder housing 24. A lock cylinder is maintained between the flanges 28,30, and retained therein by secured engagement between the two halves of the cylinder retainer 24 by means of screws or pins passing through the holes 26.

It will also be noted from FIG. 1 that a slot 32 characterizes the top end portion of the latch housing 14 and perpendicularly communicates with the opening 18. As will be described with respect to FIG. 2, this slot 32 receives a cylinder lock cam plate for locking the head of the latch which pivots through the latch head passage 18 and about a pin received in the opening 20.

Figure 2:
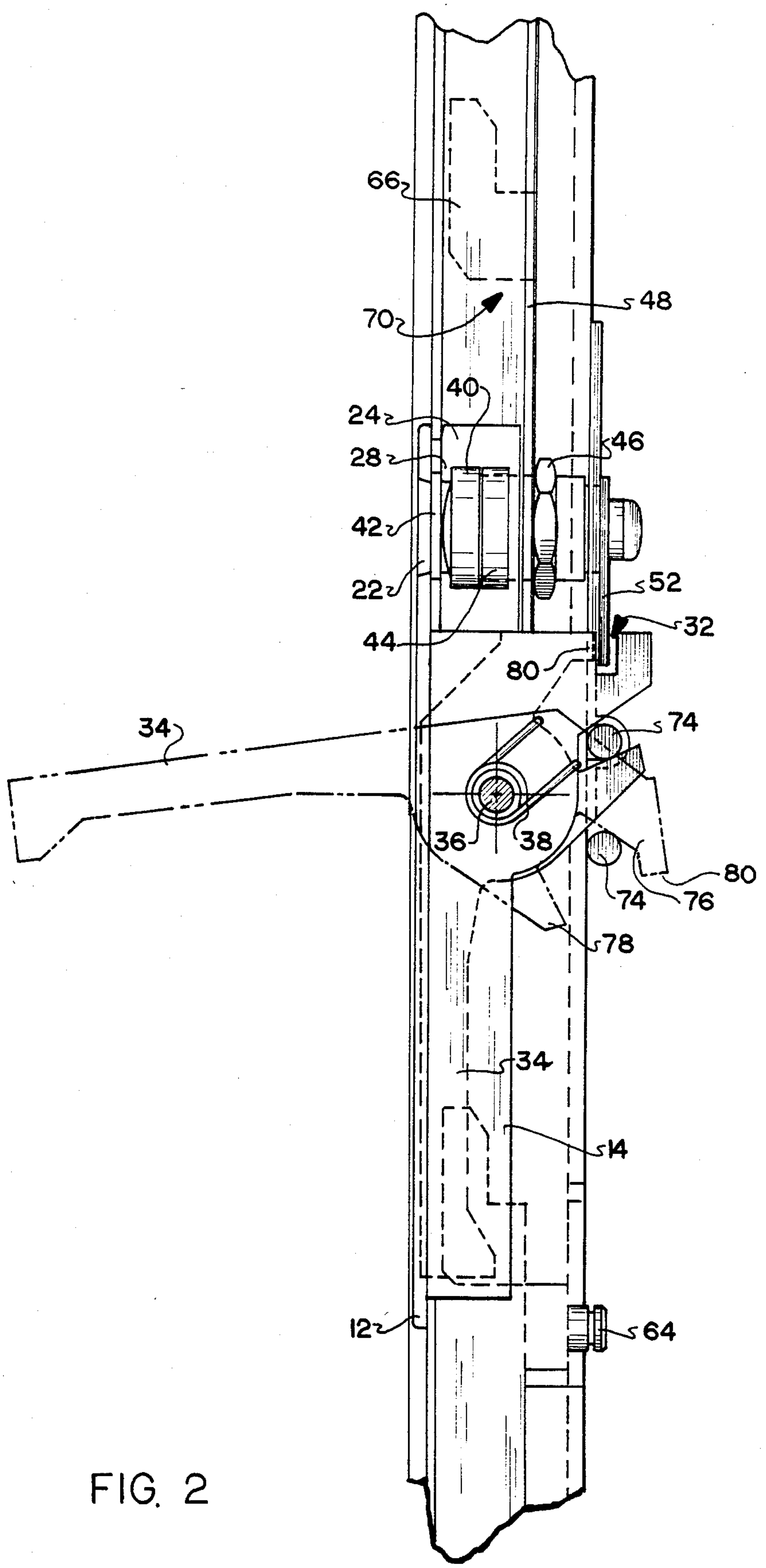
FIG. 2 is a partial sectional view of the latch rail of the invention, receiving the latch mechanism of FIG. 1, and showing the same in operative mode.

With reference now to FIG. 2, it can be seen that a latch handle 34 is pivotally maintained about a latch pin 36, received in the opening 20 of the latch housing 14. A latch handle torsion spring 38, maintained about the pin 36, urges the handle 34 into a slightly opened position, such that the handle 34 protrudes slightly from the cavity within the housing 14 in which it is maintained when in the locked position.

As will be discussed hereinafter, the latch handle 34 is shown in two positions in FIG. 2, in the opened position by the intermittently dashed lines, and in the closed position by the continuously dashed lines.

A key-actuated lock cylinder 40 is maintained in the cylinder retainer housing 24 as shown. A security disc 42 is provided in juxtaposition to the opening 22 and maintained between the flange 28 and the back of the front plate 12. The security disc 42 is preferably of hardened steel, and is freely rotatable within its confined position. It is, of course, provided with a slot therein such that a key may pass through the slot and into the lock cylinder 40. In any event, being freely rotatable, a drill may not be used for making access to the cylinder 40, for the drill will merely rotate the security disc 42 upon contact and will not cut therethrough. Similarly, the disc 42 prevents access by a cylinder puller.

It is a particular attribute of the instant invention that the cylinder housing 24 is adapted for receipt of any of numerous lock cylinders. In other words, the spacing between the retaining flanges 28,30 is sufficient to accommodate a variety of lock cylinders so long as cylinder spacers or shims 44 are used to take up slack space within the housing.

A locking nut 46 threads upon the lock cylinder 40, securing the same within the cavity of the housing 24, while further securing the latch assembly 10 to the latch rail. As shown in FIG. 2, and as will be more apparent from FIG. 3, a latch rail receives the latch assembly, such rail consisting of a back rail portion 48 and a front rail portion or channel 50. It is the front channel portion 50 which is housed to receive the latch assembly 10 such that the front plate 12 is flush therewith.

As further illustrated in FIG. 2, a lock cam plate 52 is connected to the cylinder 40, and rotatable therewith. The cam plate 52, in the locked position, is maintained within the slot 32 of the housing 14, retaining the handle 34 in the locked position as shown by the dashed lines of FIG. 2.

FIG. 3 illustrates a cross-sectional view of the latch rail of the invention showing the same interconnected with the two doors, one on either side of the cabinet, being secured. As can be seen, a right door 54 and a left door 56 are shown as being closed upon the latch rail comprising a back 48 and a front channel member 50. Each of the doors 54,56 includes respective channel door edges 58,60, such door edges defining cavities in the channel portions. A slide bar 62 is maintained by retaining rings or other suitable retainers 64, such retainers being affixed to the back of the latch rail 48. The slide rail 62 has an appropriate slot therein to allow the slide bar 62 to move vertically. The slide bar 62 is provided with a plurality of locking wings or bars 66,68, also shownn in FIG. 2, which locking wings pass through slots 70,72 in the door channels 58,60 and the latch rail members 48,50. While only a pair of locking wings have been shown in the drawings, it will be understood that each door may engage with two or more such locking wings to effect secured engagement of the doors with the latch rail 48,50.

As shown in FIG. 2, the latch rail has attached thereto a latch rail pin 74, which pin is positioned for engagement with the head of the latch handle 34 to effectuate upward or downward movement of the slide bar 62 to effect locking or unlocking of the doors 54,56. As illustrated, the latch rail pin 74 may be contacted by the opening cam surface 76 at the head of the latch handle 34 for downward unlocking movement, as shown by the position in FIG. 2 of the handle 34, illustrated by the intermittently dashed line. Locking of the doors 54,56 is achieved by engagement of the closing cam surface 78 of the latch head and the upward movement of the slide bar 62 to the totally closed position shown by the latch handle, as illustrated with the totally dashed lines.

It will be appreciated that when the slide bar 62 has been moved upwardly, the locking wings 66,68 go to the top of the slots 70,72 so that the doors cannot be opened. When the locking wings 66,68 have been moved downwardly by the upward pivotal movement of the latch handle 34, the locking wings 66,68 are moved to the bottom of the slots 70,72 such that the doors 54,56 can be opened with the wings passing through the slots as the doors open.

As will further be noted in FIG. 2, the opening cam 76 has at the end thereof a flat surface 80 which, in the locked position of the latch handle 34, is withdrawn past the slot 32. In this position, the latch rail pin 74 has urged the slide bar 62 upwardly such that the locking wings 66 are at the tops of the slots 70,72, locking the doors 54,56 against the latch rail 48,50. A key inserted through the slot in the security disc 42 may then be used to rotate the cylinder 40, rotating the lock cam plate 52 into the slot 32, against the surface 80, and thereby preventing retraction of the handle 34 from its recess.

It will also be appreciated that the cam plate 52, received within the slot 32, acts as a brace for the cylinder 40, preventing the same from being punched out and thereby rendered inoperative.

When the lock cylinder 40 is again rotated to remove the cam plate 52 from the slot 32, the spring 38 will urge the handle 34 slightly out of its recess such that it may be grasped by the operator and pivoted upwardly, moving the latch rail pin 74 downwardly to disengage the doors 54,56.

Thus it can be seen that the objects of the invention have been satisfied by the structure presented hereinabove. While in accordance with the patent statutes only the best mode and preferred embodiment of the invention have been presented and described in detail, the invention is not limited thereto or thereby. Accordingly, for an appreciation of the true scope and breadth of the invention, reference should be had to the appended claims.

What is claimed is:

1. A latch assembly, comprising:

a latch housing;

a handle received within a recess within said latch housing, said handle being pivotal about the axis;

a spring in engagement with said handle and urging said handling from said recess;

means for engaging said handle and maintaining said handle within said recess at a position whereat said handle is entirely recessed with respect to a front surface of said latch housing, said means comprising a slot within said latch housing, securing means adapted for selective positioning in said slot; and a lock cylinder housing connected to and extending from said latch housing, said lock cylinder housing having a cavity therein between first and second flanges for receiving a lock cylinder.

2. The latch assembly according to claim 1 wherein said spring engages said handle about said axis.

3. The latch assembly according to claim 1 wherein said latch housing has an opening therein in communication with said lock cylinder, and wherein a freely rotating disc is interposed between said opening and said first flange.

4. The latch assembly according to claim 1 wherein said lock cylinder housing comprises a first half secured to said latch housing and a second half selectively secured to said first half and thereby defining said cavity, and further including shims between said lock cylinder and said second flange for securely maintaining any of a plurality of lock cylinders within said cavity.

5. The latch assembly according to claim 1 wherein said securing means comprises a plate connected to and rotatable with said lock cylinder.

6. The latch assembly according to claim 1 wherein said handle includes opening and closing cam surfaces having interposed therebetween a slide bar having locking means extending therefrom, pivotal movement of said handle effectuating movement of said slide bar.

7. In a cabinet, a device for securing a door thereof, comprising:

a latch housing having a recess therein, said latch housing being received by said cabinet and being substantially flush with a surface thereof, said latch housing having an opening therein and a slot transversing said opening;

a handle received within said recess and pivotal within said opening about an axis, pivotal movement of said handle transversing said slot;

a lock cylinder housing connected to said latch housing and having a lock cylinder maintained therewithin; and a locking plate connected to said lock cylinder and selectively positioned within said slot, engaging said handle, and maintaining said handle within said recess.

8. The device according to claim 7 wherein said handle is maintained within said recess at a point below a front surface of said latch housing, and which further includes spring biasing means engaging said handle and urging said handle from said recess.

9. The device according to claim 8 wherein said lock cylinder housing includes front and rear retaining flanges receiving said lock cylinder therebetween and further including shims between said lock cylinder and said rear flange for securing said lock cylinder between said flanges.

10. The device according to claim 9 which further includes a freely rotatable disc interposed between said front flange and a back surface of said latch housing.

11. The device according to claim 7 wherein said latch housing is adapted for secured engagement to the cabinet by securing means having a terminal point within said recess and concealed by said handle.

* * * * *